(12) United States Patent
Biegler et al.

(10) Patent No.: US 7,454,260 B2
(45) Date of Patent: Nov. 18, 2008

(54) SYSTEMS AND METHODS FOR PRODUCTION PLANNING WITH SEQUENCE INDEPENDENT SETUP ACTIVITIES

(75) Inventors: Hans-Juergen Biegler, Oftersheim (DE); Christian Embacher, Ketsch (DE); Christoph Glania, Muehlhausen (DE); Nikolaus Jacob, Kippenheim (DE); Thorsten Kulick, Bensheim (DE); Thomas Schulz, Speyer (DE); Carmen Riepp, Reilingen (DE)

(73) Assignee: SAP AG, Walldorf (DE)

( * ) Notice: Subject to any disclaimer, the term of this patent is extended or adjusted under 35 U.S.C. 154(b) by 36 days.

(21) Appl. No.: 11/580,090

(22) Filed: Oct. 13, 2006

(65) Prior Publication Data

US 2007/0093923 A1    Apr. 26, 2007

(30) Foreign Application Priority Data

Oct. 24, 2005  (EP) .................................. 05023129

(51) Int. Cl.
*G06F 17/60* (2006.01)
(52) U.S. Cl. .............................. 700/99; 700/104; 705/8
(58) Field of Classification Search .................. 700/97, 700/99, 100, 101, 103, 104; 705/8
See application file for complete search history.

(56) References Cited

U.S. PATENT DOCUMENTS

| | | | | |
|---|---|---|---|---|
| 5,195,041 A | * | 3/1993 | George et al. | 700/100 |
| 5,258,915 A | * | 11/1993 | Billington et al. | 700/103 |
| 5,351,195 A | * | 9/1994 | Sherman | 700/100 |
| 5,463,555 A | * | 10/1995 | Ward et al. | 700/96 |
| 5,826,236 A | * | 10/1998 | Narimatsu et al. | 705/8 |
| 6,141,647 A | * | 10/2000 | Meijer et al. | 705/1 |
| 6,198,980 B1 | * | 3/2001 | Costanza | 700/99 |

OTHER PUBLICATIONS

European Patent Office Communication, dated Dec. 29, 2005, for European Application No. EP 05023129.9 (7 pages).

* cited by examiner

*Primary Examiner*—Albert DeCady
*Assistant Examiner*—Douglas S Lee
(74) *Attorney, Agent, or Firm*—Finnegan, Henderson, Farabow, Garrett & Dunner, LLP

(57) ABSTRACT

Systems, methods, and computer program products are provided for planning production processes. In one implementation, a method is provided that includes the steps of planning a sequence of processes running on a resource, where the planning takes into account setup times for the resource for a process depending at least on predecessor process information, storing the sequence of processes, and defining time intervals for the resource within which setup times for processes are held constant independently of the predecessor process information.

21 Claims, 3 Drawing Sheets

SYSTEMS AND METHODS FOR PRODUCTION PLANNING WITH SEQUENCE INDEPENDENT SETUP ACTIVITIES

TECHNICAL FIELD

The present invention relates generally to electronic data processing and production planning processes. More particularly, and without limitation, the invention relates to systems and methods for production planning with sequence independent setup activities.

BACKGROUND

In production processes, resource utilization may be planned within a planning unit. Processes are planned to be run on resources. During execution, the processes may be executed on the resources as planned. Running a process may include various steps, such as: setup the resource, production on the resource, and possibly tear or shut down the resource.

A process may be an activity or operation on a resource. A resource may be, for example, a machine, a utility, a material, a production plant, a transportation unit, or any other means suitable for working, producing, transporting, or packing a product, material, or assembly.

If a process is executed on a machine, the duration of a production step is determined by the machine itself, i.e., the duration of the production section on the machine is related to the rate or throughput of the machine.

However, the setup time for setting up a resource often may not only be determined by the resource itself, but also by predecessor processes running on the resource and the materials used on the resource for the present process.

The scheduling of processes should take into account information about predecessor processes and materials when executing the process planning. A certain sequence of processes may be assumed and depending on this sequence, setup times for resources may be estimated. These setup times depend at least on the process itself and the predecessor process.

During execution, an execution unit can read the process plan from a database and utilize the resources according to this plan. Process progress may be reported back to the scheduling unit from the execution unit and stored in a database. This feedback, however, may influence the planning, such as when progress of a process is not in conformance with a planned progress. During production, the storage of feedback of a process progress may influence the planning of the following processes. Due to the feedback, the processes may be automatically rescheduled to be in conformance with the actual situation at the execution.

In the very short term horizon, e.g., near the time of execution, the sequence of processes should not change. Nevertheless, the real data from the execution feedback may change the planning situation when the sequence of processes is scheduled automatically. This may cause a process backlog because of late confirmations of processes. Processes may be confirmed late due to confirmations of processes being reported to scheduling late, after actual execution of the processes, or due to the sequence in which the processes are confirmed differing from the planned sequence.

The result of the interplay of process planning and process execution can be seen in the following example. After each process confirmation, the sequence dependent setup times of concerned, not confirmed processes have to be adjusted. This happens automatically, because in this example the confirmed date differs from the planned date.

Automatically rescheduling the sequence of processes may confuse the process planner. After each process confirmation, the setup times may change within the planning board, resulting in changed sequences of process.

In view of the foregoing, there is a need for systems and methods for process planning that takes into account short term planning. The process planning in short term needs to be predictable and reliable. Short term changes to the actual sequence of processes should not influence the previously planned sequence of processes.

SUMMARY

In order to overcome these problems, embodiments consistent with the present invention provide systems and methods for planning production processes. In one embodiment, a method is provided that includes planning a sequence of processes running on a resource, the planning taking into account setup times for the resource for a process depending at least on predecessor process information, storing the sequence of processes, and defining time intervals for the resource within which setup times for processes are held constant independently of the predecessor process information.

In accordance with additional embodiments of the present invention, computerized systems and computer program products may be provided. A computer program product may be tangibly embodied in an information carrier and include a computer program stored thereon. In one embodiment, the computer program product may include instructions that, when executed, perform a method including the steps of planning a sequence of processes running on a resource, the planning taking into account setup times for the resource for a process depending at least on predecessor process information, storing the sequence of processes, and defining time intervals for the resource within which setup times for processes are held constant independently of the predecessor process information.

Further embodiments consistent with the present invention may provide systems for planning production processes. In one embodiment, the system may include a scheduling unit arranged for planning a sequence of processes running on a resource, the planning taking into account setup times for the resource for a process depending at least on predecessor process information, a storage unit arranged for storing the sequence of processes, and a fixing unit arranged for defining time intervals for the resource within which setup times for processes are held constant independently of the predecessor process information. The system may also include an execution unit arranged for retrieving the sequence order from the storage unit, executing the processes on the resource and reporting process progress to the storing unit.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
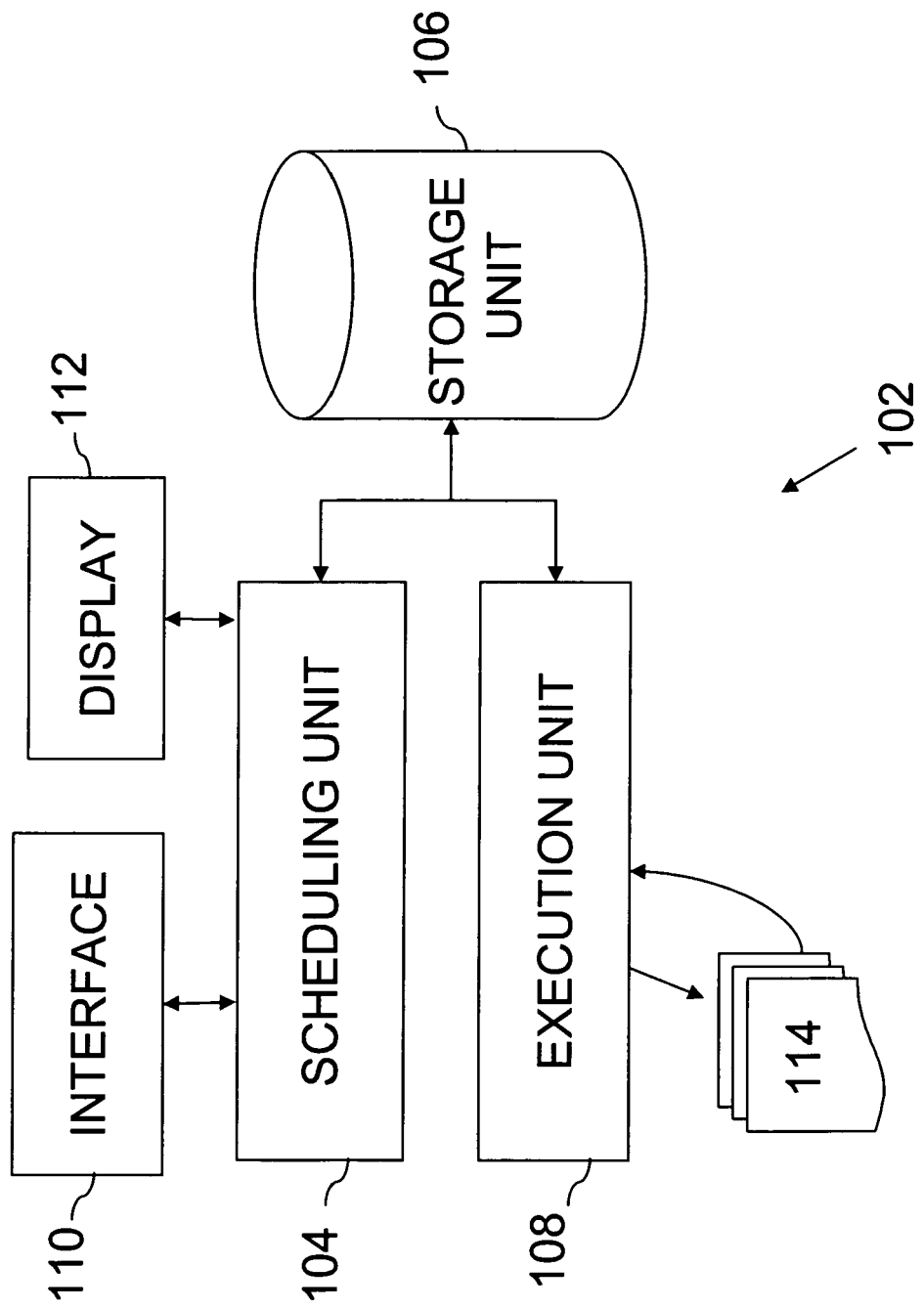
FIG. 1 illustrates, consistent with an embodiment of the invention, a block diagram of an exemplary system.

FIG. 1 illustrates an exemplary system 102 for executing methods consistent with embodiments of the present invention. System 102 may include a scheduling unit 104, a storage unit 106, an execution unit 108, an interface 110, a display 112, and production order sheets 114. In addition, a fixing unit (not shown) may be provided that is provided as a separate unit or integrated as part of one of the other shown units (e.g., scheduling unit 104). Further details concerning the fixing units and other components are provided below. In addition, as shown in FIG. 1, scheduling unit 104 may interact and use interface 110 to receive production orders and display 112 to display user information and provide a user interface.

A computer program or modules may be distributed on scheduling unit 104 and execution unit 108. Consistent with embodiments of the invention, execution of the computer program may result in a method, such as the exemplary method 202, for production planning (see FIG. 2).

Figure 2:
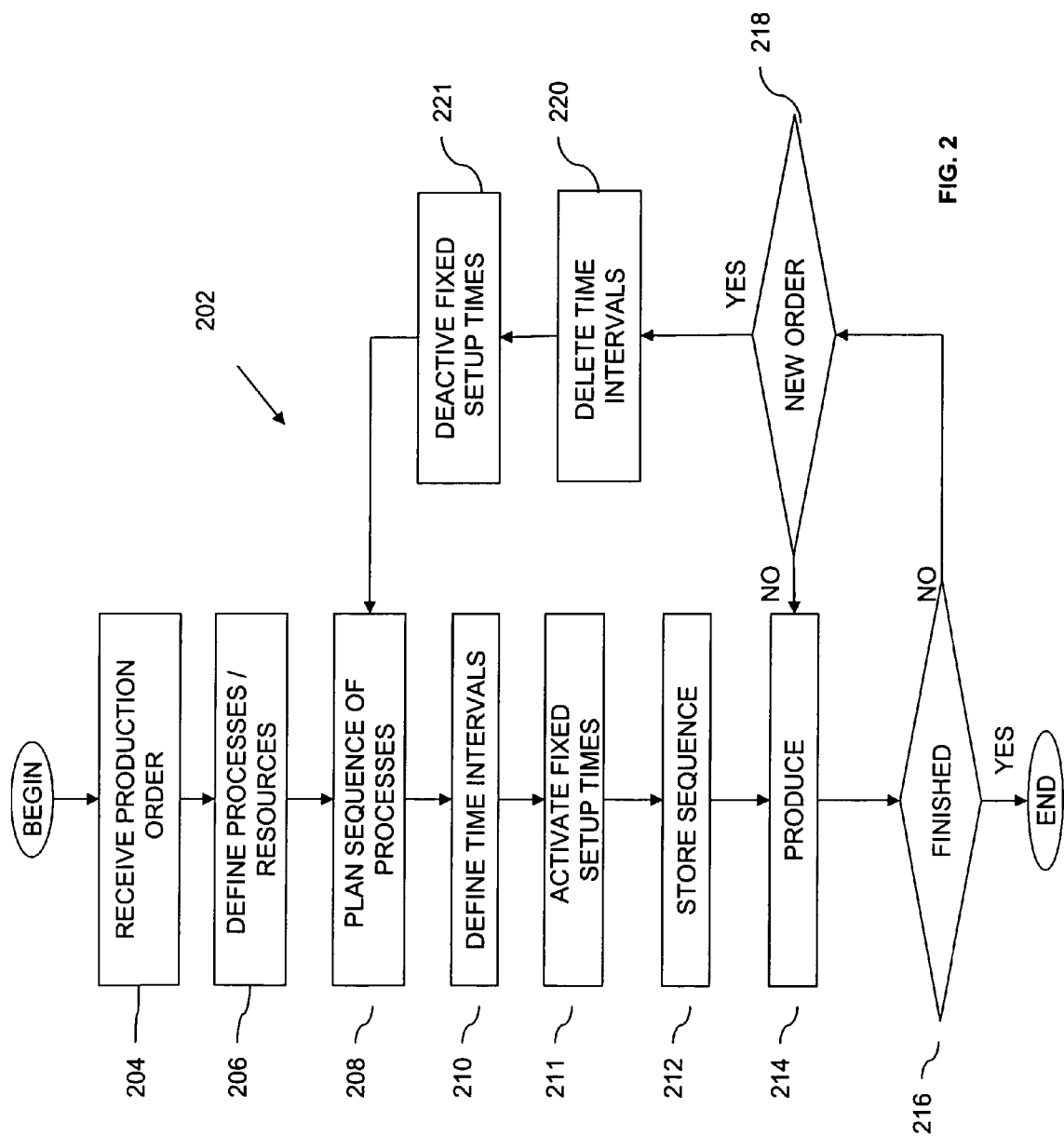
FIG. 2 illustrates, consistent with an embodiment of the invention, a flowchart of an exemplary method.

Referring to step 204 in FIG. 2, scheduling unit 104 may receive from interface 110 a production order from an enterprise resource planning (ERP) system, such as SAP® R/3, my.SAP®, SAP Netweaver®, or any other production planning system.

In step 206, scheduling unit 104 may use the received production order to determine resources necessary to finalize the production order. Scheduling unit 104 may also identify the processes that need to be run on the resources.

After having identified the resources and processes, scheduling unit 104 may plan a sequence of processes in step 208 to finalize the production order. The planning of the sequence of processes may minimize setup times depending on predecessor processes and minimize the overall time for finalizing the production order. The setup time for a resource may depend mainly on predecessor process information, such as the current state and type of the predecessor process on the resource. For example, if the resource is a printer, the setup time for utilizing the printer with a dark color after a bright color is less than the setup time for utilizing the printer with a bright color after a dark color.

After having calculated a schedule of processes taking into account the setup times between different processes and minimizing the overall time for finalizing the production order, at step 210 a fixing unit may define time intervals within which the setup times for the resources may be held constant independently of the predecessor process. Within this time interval, the fixing unit may activate or fix the setup times at step 211. Steps 210 and 211 may be combined into one single step. The definition of time intervals for fixed setup times is explained in more detail in combination with the example of FIG. 3.

Once a time interval has been found, within which the setup times may be fixed, a parameter for the resource can be changed to inform the scheduling unit about the activation of fixed setup times (step 211) for the particular resource. In order to prevent unauthorized users from changing the parameter, the user's authorization to change parameters for the resources may be verified.

In one embodiment, the deactivation of a sequence dependent setup time and activation of fixed setup times (step 211) may turn the process into a process with fixed duration, which is independent of a predecessor process.

In order to enable users to define which time intervals are suitable for fixing the setup times, scheduling unit 104 may provide a user interface, such as user interface 112, as described in more detail with reference to FIG. 3 below.

At step 212, the sequence of processes as planned in step 208 together with fixed time intervals, within which the setup times for the resources can be held constant independently of the predecessor process, is stored within storage unit 106.

Execution unit 108 may read from storage unit 106 the sequence of processes. In one embodiment, in order to enable production to carry out the processes as planned, production order sheets 114 may be printed out. With these order sheets 114, the staff can operate resources as planned at step 214. Further, the progress of a resource may be reported to execution unit 108 using a feedback feature.

In one embodiment, the feedback may be stored in storage unit 106 and used, at step 216, to determine whether the production order is finished. If the production order is finished, scheduling for this production order may be stopped.

If the production order is not finished, at step 218, a check may be performed to determine whether a new production order or an order change has been received via interface 110 in planning unit 104. If not, at step 214 production may be further carried out.

If an order change was received on interface 110, e.g., due to partial confirmation, change of order quantity, change of source of supply, or other circumstances, the order change may be accounted for within production planning.

For example, in case an order change relates to a change of quantity, some processes which were assigned fixed setup times may be moved outside the selected time interval. In this example, the fixed setup times may not correspond to the predecessor process anymore.

Confirmed processes may also lie outside the time interval. If so, the confirmed process may be deactivated because these processes cannot be rescheduled due to their state.

In case of an order change, it may be possible to re-schedule processes. In such cases, at step 220, defined time intervals may be deleted. Together with the deletion of the time intervals (step 220), the fixed setup times for resources can be deactivated (step 221). In one embodiment, the steps 220 and 221 can be performed in parallel or combined into one single step.

After having deleted the selected time intervals (step 220) and deactivated the fixed setup times (step 221), in step 208 the sequence of processes may again be planned and the method of FIG. 2 may continue.

Figure 3:
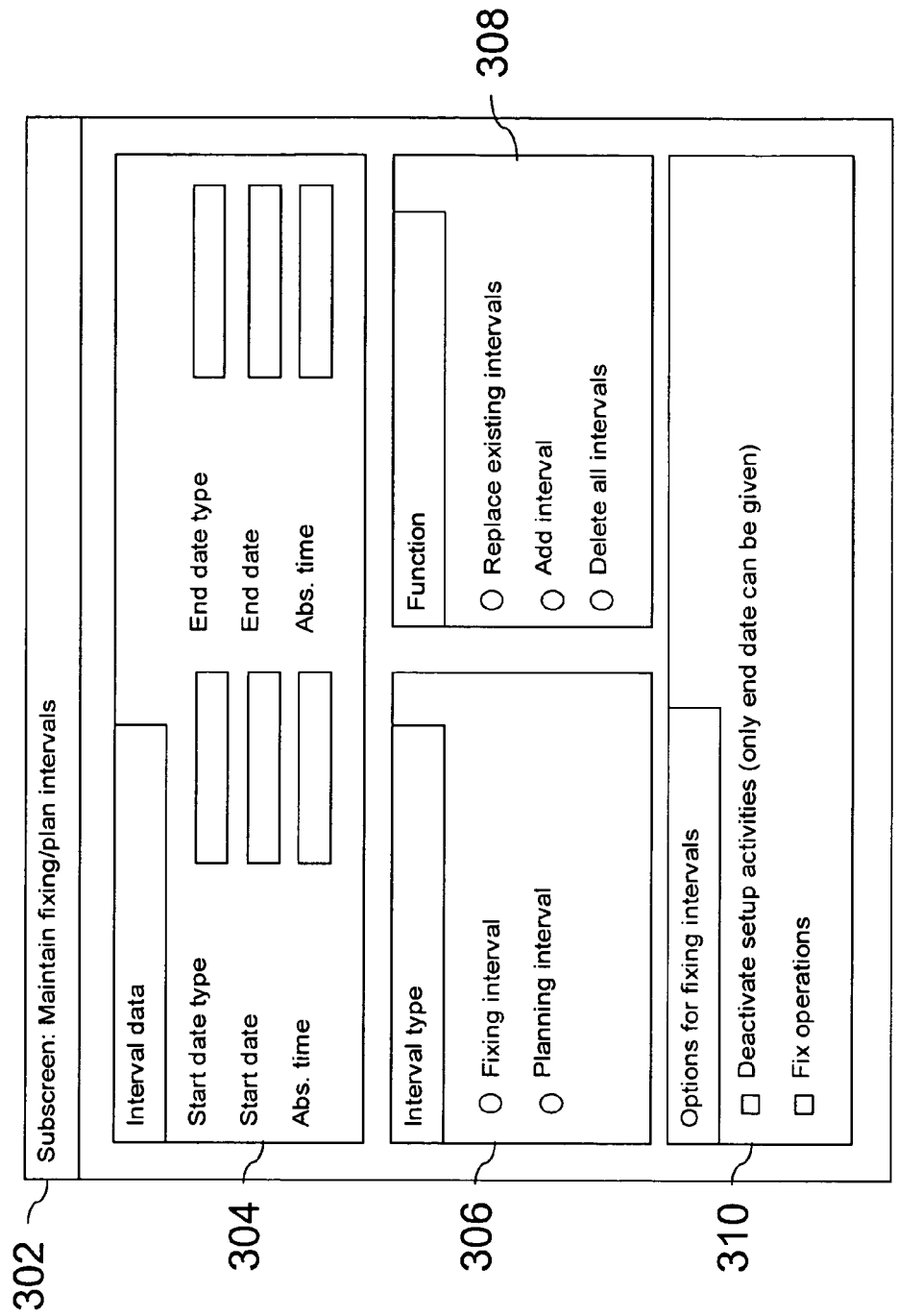
FIG. 3 illustrates, consistent with an embodiment of the invention, a screenshot of an exemplary computer program for adjusting time intervals.

FIG. 3 illustrates, consistent with embodiments of the invention, an exemplary screenshot 302 of a user interface, such as interface 110. The user interface may include an interval data section 304, an interval type section 306, a function section 308, and an options section 310.

Interval data section 304 may receive a relative start date and an end date with an absolute time. The information provided in data section 304 may have a data type containing the values Hours, Days, Weeks and/or Months.

Interval type section 306 may receive an indication of whether intervals should have fixed setup times or intervals where the sequence of processes shall be planned dynamically.

Existing intervals may be replaced by new intervals, new intervals may be added, and existing intervals may be deleted in function section 308.

Options section 310 may allow deactivation of all sequence dependent setup times within a fixing interval or activation of sequence dependent setup times. This option may be restricted to the condition that the start of the interval must be empty, which may be checked by system 102, for example. If an existing time interval with fixed setup times that was previously created is extended, then the deactivated sequence dependent setup times may only be activated when they are outside of the new fixing intervals. The sequence dependent setup times that lie within the new fixing interval can be deactivated.

In one embodiment, a heuristic can be used to apply the selected time intervals that are suitable for fixing the setup times onto the resources for further process planning. Such time intervals may be close to the execution time, e.g., within hours, days, weeks and months of the execution time. The duration and position of these time intervals may depend on the rate of a production process. For example, in processes which take a long time to finish the order, the time interval may be chosen longer than for processes which finalized tens, hundreds, thousands, or even more orders within short time, such as minutes, hours, or days. The heuristic may be understood as a rule, which converts the user selections of time intervals and activation/deactivation of fixed setup times onto the resources so that these operate and react during further production planning accordingly.

It will be understood that various modifications may be made without departing from the spirit and scope of the claims, such as performing steps of the disclosed methods in a different order, combining components of the disclosed systems in a different manner, and/or replacing or supplementing components of the disclosed systems with other components.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present invention may be implemented in various environments.

Such environments and related applications may be specially constructed for performing the various processes and operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand alone program or as a module, component, subroutine, or other unit suitable for use in a computing environment. A computer program can be deployed to be executed on one computer or on multiple computers at one site or distributed across multiple sites and interconnected by a communication network.

Other embodiments of the invention will be apparent to those skilled in the art from consideration of the specification and practice of the embodiments and features of the invention disclosed herein. It is intended, therefore, that the specification and embodiments be considered as exemplary only, with a true scope and spirit of the invention being indicated by the following claims.

What is claimed is:

1. A computer-implemented method for planning production processes, the method comprising:
    planning a sequence of processes running on a resource, the planning taking into account setup times for the resource for a process depending at least on predecessor process information;
    storing the sequence of processes in a computer-readable storage medium;
    defining time intervals for the resource within which setup times for processes are held constant independently of the predecessor process information; and
    using the sequence and the defined time intervals to execute the processes.

2. The computer-implemented method of claim 1, further comprising retrieving the stored sequence of processes for execution on the resource.

3. The computer-implemented method of claim 1, further comprising storing the predecessor process information.

4. The computer-implemented method of claim 1, further comprising storing the sequence of processes and the predecessor process information within one database.

5. The computer-implemented method claim 1, wherein defining time intervals comprises utilizing a heuristic to find time intervals on the resource within which the setup times can be held constant.

6. The computer-implemented method of claim 1, wherein the time intervals are within the range of at least one of hours, days, weeks, and months.

7. The computer-implemented method of claim 1, wherein defining time intervals comprises determining time intervals near the execution time.

8. The computer-implemented method of claim 1, wherein the predecessor process information comprises at least one of a predecessor process and the progress of a predecessor process.

9. The computer-implemented method of claim 1, wherein planning the sequence order comprises planning a sequence of processes on a resource to minimize setup times depending on predecessor process information.

10. A computer readable medium comprising program code instructions which, when executed by a processor, perform a method for planning production processes, the method comprising:
    planning a sequence of processes running on a resource, the planning taking into account setup times for the resource for a process depending at least on predecessor process information;
    storing the sequence of processes; and
    defining time intervals for the resource within which setup times for processes are held constant independently of the predecessor process information.

11. The computer readable medium of claim 10, further comprising storing the sequence of processes and the predecessor process information within one database.

12. The computer readable medium of claim 10, wherein defining time intervals comprises utilizing a heuristic to find time intervals on the resource within which the setup times can be held constant.

13. The computer readable medium of claim 10, wherein defining time intervals comprises determining time intervals near the execution time.

14. The computer readable medium of claim 10, wherein the predecessor process information comprises at least one of a predecessor process and the progress of a predecessor process.

15. The computer readable medium of claim 10, wherein planning the sequence order comprises planning a sequence of processes on a resource to minimize setup times depending on predecessor process information.

16. A system for planning production processes, the system comprising:

a scheduling unit arranged for planning a sequence of processes running on a resource, the planning taking into account setup times for the resource for a process depending at least on predecessor process information;

a storage unit arranged for storing the sequence of processes;

a fixing unit arranged for defining time intervals for the resource within which setup times for processes are held constant independently of the predecessor process information; and an execution unit arranged for retrieving the sequence order from the storage unit, executing the processes on the resource, and reporting process progress to the storing unit.

17. The system claim 16, wherein the fixing unit defines the time intervals utilizing a heuristic to find time intervals on the resource within which the setup times can be held constant.

18. The system of claim 16, wherein the fixing unit defines the time intervals within the range of at least one of hours, days, weeks, and months.

19. The system of claim 16, wherein the fixing unit defines the time intervals by determining time intervals near the execution time.

20. The system of claim 16, wherein the predecessor process information comprises at least one of a predecessor process and the progress of a predecessor process.

21. The method of claim 16, wherein the scheduling unit plans the sequence order by planning a sequence of processes on a resource to minimize setup times depending on predecessor process information.

\* \* \* \* \*